Sept. 14, 1926. 1,599,551
C. W. CALDWELL
MICROMETER WEIGHING INSTRUMENT
Filed July 15, 1925
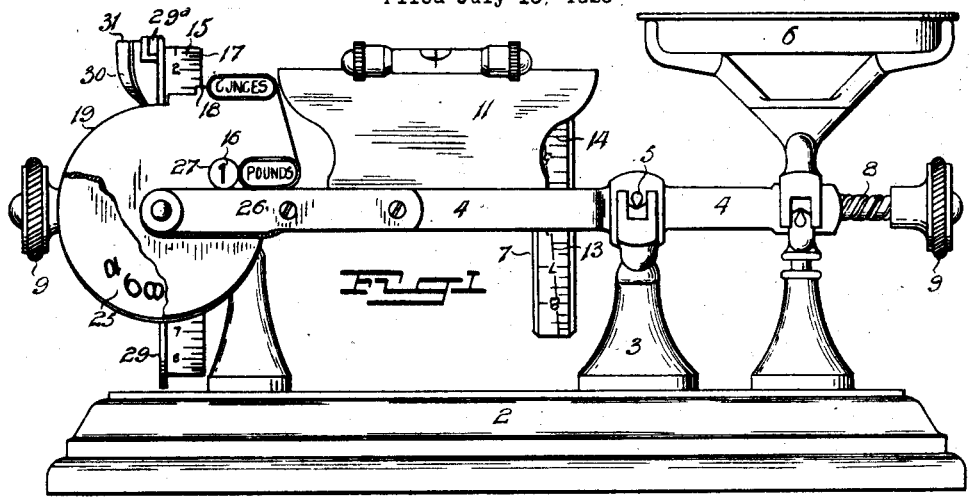
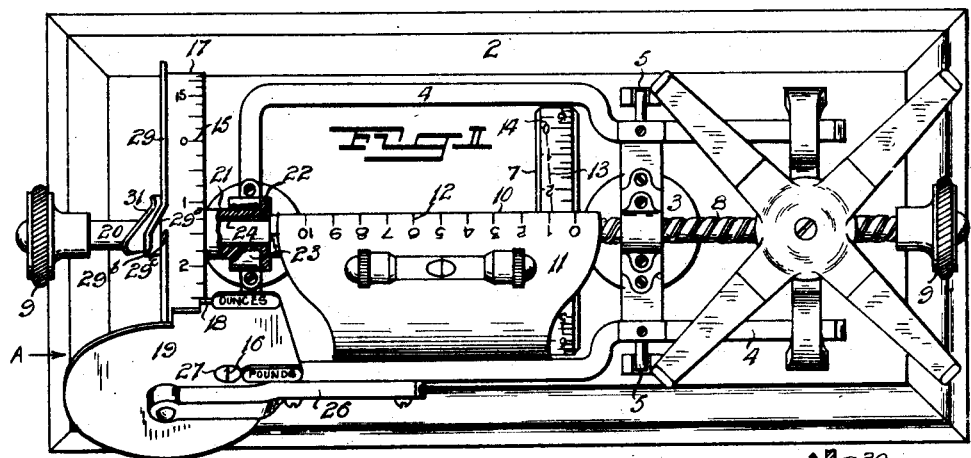
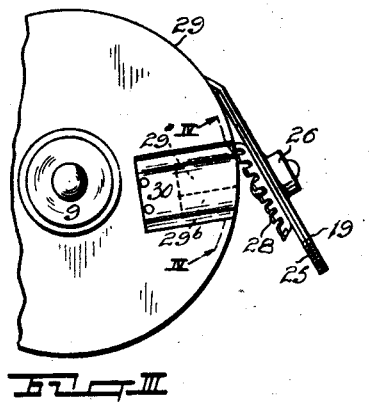
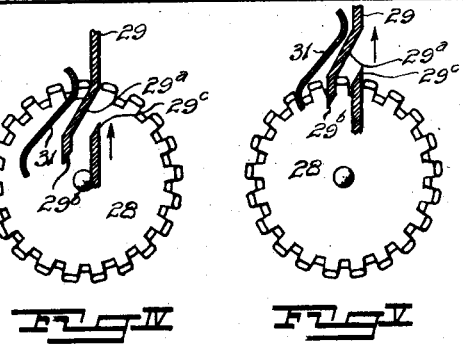
INVENTOR:
Charles W. Caldwell
By Richards & Geier
Attys Patented Sept. 14, 1926.

1,599,551

UNITED STATES PATENT OFFICE.

CHARLES WILLIAM CALDWELL, OF BEREA, JOHANNESBURG, TRANSVAAL, SOUTH AFRICA.

MICROMETER WEIGHING INSTRUMENT.

Application filed July 15, 1925. Serial No. 43,672.

The present invention has reference to weighing instruments of the kind in which a pivoted beam is provided with a poise movable along the beam by means of a so-called micrometer screw actuated by hand.

The purpose of the invention is to provide an inexpensive arrangement for exhibiting the weight of the goods in such a manner that the figures are easily read by the purchaser.

The invention is illustrated in the accompanying drawing in which—

Fig. I is a view of the instrument as seen by the purchaser.

Fig. II is a plan.

Fig. III is a partial end view as seen from the direction of the arrow A, Fig. II, but showing parts differently positioned from Figs. I and II.

Fig. IV is an enlarged sectional view taken on IV—IV Fig. III.

Fig. V is similar to Fig. IV, but shows the parts differently positioned.

2 indicates a base on which is a standard 3 carrying the beam 4 by means of pivots 5. The scale pan 6 and the goods thereon, on one side of the pivots, are counterbalanced by the poise 7 on the other side of the pivots. The poise is shifted along the beam by means of the micrometer screw 8 rotatably mounted in the beam and actuated by the hand wheels 9.

The rim of the poise 7 moves in close proximity to the edge 10 of a plate 11 fixed to the beam. On said plate is a numbered scale 12 with which a line 13 on the rim co-operates to indicate pounds; and on the rim of the poise is a further numbered scale 14 with which the edge 10 of the plate 11 co-operates to indicate ounces.

The scales 12 and 14 are arranged to be read from the salesman's side of the instrument; but are not easily visible to a purchaser standing at the opposite side of the instrument from the salesman. For exhibiting the weight to the customer the invention provides the additional ounce and pound indications 15, 16.

The ounce scale 15 is marked on the rim of a light drum 17 and co-operates with the edge 18 of a plate 19 fixed to the beam. Said scale 15 is similar to the scale 14 except that its numerals are arranged oppositely to those on the rim of the poise so as to be upright when viewed from the customer's side of the instrument.

The drum 17 is arranged to rotate with the poise 7, but not to traverse. In the instrument shown the shaft 20 in which the micrometer screw 8 is formed, is arranged both to rotate and to traverse. Consequently the drum is not in this case fixed to said shaft but is rotatably mounted by means of its hollow journal 21 in the bearing 22 at the end of the beam, said bearing having a detachable cap 23. Rotational engagement of the shaft and the drum is effected by a spline 24.

The weight in pounds is preferably indicated by numerals 16 marked on a dial 25 arranged to face the customer and rotatably mounted on an extension 26 of the beam. Said numerals are preferably exhibited one at a time through an aperture 27 in the plate 19, the dial being for that purpose arranged behind said plate.

In order to give a perfectly clear and definite pound indication, it is preferred to arrange the dial 25 to remain stationary during the greater part of each revolution of the assembly comprising the poise 7, shaft 20 and drum 17. The dial is rotated step-by-step, the rotation taking place at about the moment when the nought ounce figure is at the indicating edge 18, and the stepping being completed during the angular movement of the drum 17 equivalent to a fraction of an ounce.

With this object a crown wheel 28 is fixed to the back of the dial 25 and engages with a flange or thread 29 on the drum 18. Such flange or thread may be regarded as a drunken screw thread which remains in one plane perpendicular to the axis of rotation of the drum for the greater part of its circumferential extent, and the angularly disposed portion 29$^a$ of which is of correspondingly limited angular extent.

Movement of said portion 29$^a$ past the crown wheel rotates the latter through one tooth space, which is equal to the angular spacing of the pound numerals 16. Fig. IV shows the thread portion 29$^a$ just on the point of moving the crown wheel to exhibit a higher pound figure, and Fig. V shows the movement just completed.

Whilst only the inclined portion 29$^a$ of the thread is required to rotate the crown wheel, it is preferred to provide the complete circumferential thread, since the non-inclined portion of the same serves to hold the dial stationary, and the crown wheel is at all times positively engaged by the drum. To insure such positive engagement, the thread is continued as indicated at 29ᵇ for a short distance past the inclined portion 29ᵃ and parallel with the commencing end 29ᶜ.

In order to minimize the shock of thus suddenly rotating the dial 25, the spring 30 may be provided. This spring is secured to the drum 17 at one end and its other end 31 is positioned to make engagement with the teeth of the crown wheel. Said end is rather longer circumferentially than the inclined thread portion 29ᵃ, so that whatever the direction of rotation of the drum said end engages its tooth slightly before the portion 29ᵃ engages a tooth. Said end also is so inclined that when it engages a tooth it yieldingly presses the crown wheel into engagement with the thread, so preparing the crown wheel for its coming movement and eliminating impact due to loose contact between the thread and the crown wheel.

I claim—

1. In a micrometer weighing instrument, the combination of a pivoted beam, a poise traversible along the same, a rotatable shaft for traversing the poise, a drum rotatable with the shaft and having a scale on its rim adapted to be properly viewed from the customer's side of the instrument, a fixed part with which said scale registers, a rotatable member, and means operatively connecting said rotatable member with said shaft to cause said member to rotate with less angular displacement than the shaft, said member indicating at the customer's side of the instrument values of a higher denomination than the scale.

2. In a micrometer weighing instrument, the combination of a pivoted beam, a poise traversable along the same, a rotatable shaft for traversing the poise, a drum rotatable with the shaft and having a scale on its rim adapted to be properly viewed from the customer's side of the instrument, a fixed part with which said scale registers, a rotatable member, means placing said rotatable member in driving engagement with the shaft and causing said member to rotate intermittently when the shaft rotates continuously, said member indicating at the customer's side of the instrument values of a higher denomination than the scale.

3. In a micrometer weighing instrument, the combination of a pivoted beam, a poise traversable along the same, a rotatable shaft for traversing the poise, a drum rotatable with the shaft, and having a scale on its rim adapted to be properly viewed from the customer's side of the instrument, a fixed part with which said scale registers, a rotatable numbered dial facing the customer's side of the instrument, means rotating said dial intermittently when the shaft rotates continuously, and apertured means covering said dial to exhibit its numbers individually.

4. In a micrometer weighing instrument, the combination of a pivoted beam, a poise traversable along the same, a rotatable shaft for traversing the poise, a drum rotatable with the shaft and having a scale on its rim adapted to be properly viewed from the customer's side of the instrument, a fixed part with which said scale registers, and a rotatable member driven from said drum so as to have a less angular displacement than the drum, said member indicating at the customer's side of the instrument values of a higher denomination than the scale.

5. In a micrometer weighing instrument, the combination of a pivoted beam, a poise traversable along the beam, a rotatable shaft for traversing the poise, a drum rotatable with the shaft and having a scale on its rim adapted to be properly viewed from the customer's side of the instrument, a fixed part with which said scale registers, a rotatable member facing the customer's side of the instrument and indicating weights of a higher denomination, a crown wheel fixed to said rotatable member and a thread on a part rotating with the shaft and engaging said crown wheel to rotate the same.

6. In a micrometer weighing instrument, the combination of a pivoted beam, a poise traversable along the beam, a rotatable shaft for traversing the poise, a drum rotatable with the shaft and having a scale on its rim adapted to be properly viewed from the customer's side of the instrument, a fixed part with which said scale registers, a rotatable member facing the customer's side of the instrument and indicating weights of a higher denomination than the scale, a crown wheel fixed to said rotatable member, and a part rotating with the shaft having a drunken thread engaging said crown wheel to rotate the same step by step.

7. In a weighing instrument, a rotatable member formed with a drunken screw thread comprising a uniplanar portion of considerable circumferential extent and an inclined portion, a rotatable crown wheel in engagement with said screw thread for intermittent rotation, and spring means rotating with the rotatable member and shaped to engage the crown wheel in advance of the inclined portion of the thread and itself so inclined as yieldingly to hold the crown wheel into engagement with the face of the thread.

In testimony whereof I have affixed my signature.

CHARLES WILLIAM CALDWELL.